US006961875B2

(12) United States Patent
Floyd et al.

(10) Patent No.: US 6,961,875 B2
(45) Date of Patent: Nov. 1, 2005

(54) METHOD AND APPARATUS FOR CAPTURING EVENT TRACES FOR DEBUG AND ANALYSIS

(75) Inventors: Michael Stephen Floyd, Leander, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1031 days.

(21) Appl. No.: 09/815,548

(22) Filed: Mar. 22, 2001

(65) Prior Publication Data

US 2004/0015880 A1    Jan. 22, 2004

(51) Int. Cl.[7] ............................................. G06F 11/00
(52) U.S. Cl. .......................................... 714/39; 714/45
(58) Field of Search ............................. 714/39, 45–47, 714/30, 34, 37, 25, 724; 712/227

(56) References Cited

U.S. PATENT DOCUMENTS

| 5,442,777 | A | * | 8/1995 | Nakajima et al. ............. 714/20 |
| 5,444,859 | A | * | 8/1995 | Baker et al. .................. 714/20 |
| 6,094,729 | A | * | 7/2000 | Mann ........................... 714/25 |
| 6,314,530 | B1 | * | 11/2001 | Mann ........................... 714/38 |
| 6,393,594 | B1 | * | 5/2002 | Anderson et al. ........... 714/738 |
| 6,760,867 | B2 | * | 7/2004 | Floyd et al. .................. 714/39 |
| 2002/0129309 | A1 | * | 9/2002 | Floyd et al. ................ 714/724 |

* cited by examiner

Primary Examiner—Dieu-Minh Le
(74) Attorney, Agent, or Firm—Richard F. Frankeny; Winstead Sechrest & Minick P.C.; Casimer K. Salys

(57) ABSTRACT

A trace array having M entries with corresponding M addresses is used to store the states of input signals. The M addresses of the trace array are sequenced with a counter that counts a clock beginning at a starting count and counting to an ending count. If the ending count is exceeded, the counter starts over at the starting count. The counter outputs are decoded to addresses of the trace array. An event signal is generated on the occurrence of an operation of interest and the counter is started and stopped in response to sequences of the event signals, thus starting and stopping the recording of states of the input signals in the trace array. When an error or particular condition signal occurs, traces corresponding to the input signals are saved in the trace array. A start signal enables tracing and event logic generates event sequence signals which alternately start and stop the recording of traces. The event sequences are programmed by inputs to enable guaranteed statistical chances of capturing states of the input signals corresponding to a particular event signal occurring before an error or another event signal.

36 Claims, 5 Drawing Sheets

METHOD AND APPARATUS FOR CAPTURING EVENT TRACES FOR DEBUG AND ANALYSIS

TECHNICAL FIELD

The present invention relates in general to transient event recording and in particular to capturing the traces of execution cycles in a computer preceding an error or other condition of interest.

BACKGROUND INFORMATION

Transient event recorders refer to a broad class of systems that provide a method of recording and eventually analyzing signals or events that precede an error or failure condition in logic, electronic, and electro-mechanical systems. Analog transient recorders have existed for years in the form of storage oscilloscopes and strip chart recorders. With the advent of low cost high speed digital systems and the availability of high speed memory, it became possible to record digitized analog signals or digital signals in a non volatile digital memory. Two problems that have always existed in these transient event recoding systems are the speed of data acquisition and the quality of connection to signals being recorded. Transient event recording systems had to have circuits and recording means that were faster than the signals that were to be recorded and the signal interconnection could not cause distortion or significant interference with desired signals.

Digital transient event recording systems have been particularly useful in storing and displaying multiple signal channels where only timing or state information was important and many such transient event recording systems exist commercially. With the advent of very large scale integrated circuits (VLSI), operating at high speeds, it has become very difficult to employ transient event recording techniques using external instrumentation. The signals to be recorded or stored could not be contacted with an external connection without a degradation in performance. To overcome this problem, trace arrays have been integrated on the VLSI chip, along with functional circuits, to facilitate the recording of signals relevant to occurring failures. Another problem that occurs when trying to use transient event recording techniques for VLSI circuits is that the trigger event, which actually began a process leading to a particular failure, sometimes manifests itself many cycles ahead of the observable failure event itself.

For hardware debugging of a logic unit in a VLSI microprocessor, a suitable set of control and/or data signals may be selected from the logic unit and put on a bus called the unit debug bus. The contents of this bus at successive cycles may be saved in a trace array. Since the size of the trace array is usually small, it can save only a few cycles worth of data from the debug bus. Events are defined to indicate when to start and when to stop storing information in the trace array. For example, an event trigger signal may be defined when a debug bus content matches a predetermined bit string "A". For example, bit string "A" may indicate that a cache write to a given address took place and this may be used to start a tracing (storing data in the trace array). Another content, bit string "B", may be used to stop storing in the trace array when it matches a content of the debug bus.

In some cases, the fault in the VLSI chip manifests itself at the last few occurrences of an event (for example, one of the last times that a cache write takes place to a given address location, the cache gets corrupted). It may not be known exactly which of these last few occurrences of the event manifested the actual error, but it may be known (or suspected) that the error was due to one of the last occurrences. Sometimes there is no convenient start and stop event for storing in the trace array. Because of this, it is difficult to capture the trace that shows the desired control and data signals for the cycles immediately before the last few occurrences of the events. This maybe especially true if system or VLSI behavior changes from one program run to the next.

The performance of VLSI chips is difficult to analyze, and failures that are transient, with a low repetition rate, are particularly hard to analyze and correct. Analyzing and correcting design problems that manifest themselves as transient failures are further exacerbated by the fact that the event that triggers a particular failure may occur many cycles before the actual transient failure itself. There is, therefore, a need for a method and apparatus for recording those signals that were instrumental in causing the actual transient VLSI chip failure. While the preceding has indicated that a failure normally terminates the trace capturing process, it should be understood that other events of interest may be used in a debug or analysis process.

SUMMARY OF THE INVENTION

A re-writeable trace array is integrated onto a VLSI chip for storing and playing back a sequence of logic states on input logic signals that occurred prior to an error or particular condition of interest. The trace array has a storage capacity of N entries and each entry records the states of a number K of input logic signals. Entries have a corresponding storage addresses which, when selected, store or reads states at the storage address. A clock is counted in a counter and the counter outputs are decoded to provide the storage addresses for the trace array such that each of the N entries corresponds to a count in the counter. A start signal enables the counter to start counting the clock which, in turn, enables states of the input logic signals to be sequential recorded in the trace array. Event sequence signals are generated in event logic which are used with a start signal to start and stop the counter and thus trace recording. Event sequence signals are generated in response to a sequence of occurrences of an event signal. A first event sequence signal may be generated for one sequence of occurrences of the event signal and a second event sequence signal may be generated for another different sequence of occurrences of the first event signal occurring after the first event sequence signal. Once the counter has started, it generates sequential storage addresses to the trace array until the counter is stopped by an event sequence signal. The counter, after first starting to count, alternately starts and stops counting the clock on the receipt of event sequence signals until stopped by an error or other condition signal of interest. If an error signal has not been received before the counter reaches its maximum count, the counter resets to an initial count and again counts up to a maximum count. If the trace array is in the write mode, old recorded states of the input logic signals are written over by new states. Once an error signal has been received, the trace array may be set in the read mode, and recorded states of the input logic signals may be read out.

Program inputs may program the event logic to generate a first and a second event sequence signal. It may be desirable to start counting after receiving one number (sequence of occurrence) of a first event signal and stop counting after receiving a different number of occurrences of the first event signal. Counting may be first started by the start signal and thereafter alternately started and stopped by the first and second event sequence signals. In another mode, counting is started by the first event sequence signal after a start signal and thereafter alternately started and stopped by succeeding event sequence signals. On the receipt of an error signal, counting stops completely and the states of the logic input signals previously recorded may be saved.

In one embodiment of the present invention, the event sequence signals are generated on each occurrence of the event signal. In this embodiment, depending on whether the counter is first started by the start signal, the trace array stores the states of input logic signals which occur preceding even or odd event signals prior to an error signal.

An embodiment of the present invention uses an analog to digital converter (A/D) to convert an analog to a digital A/D output signal. The digital A/D output signal is stored along with selected logic signals in a trace array for debugging an electro-mechanical system. The digitized analog signal and logical signals are stored in the trace array according to embodiments of the present invention. Multiple A/D converters may be used if multiple analog signals are to be used in the debugging process.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
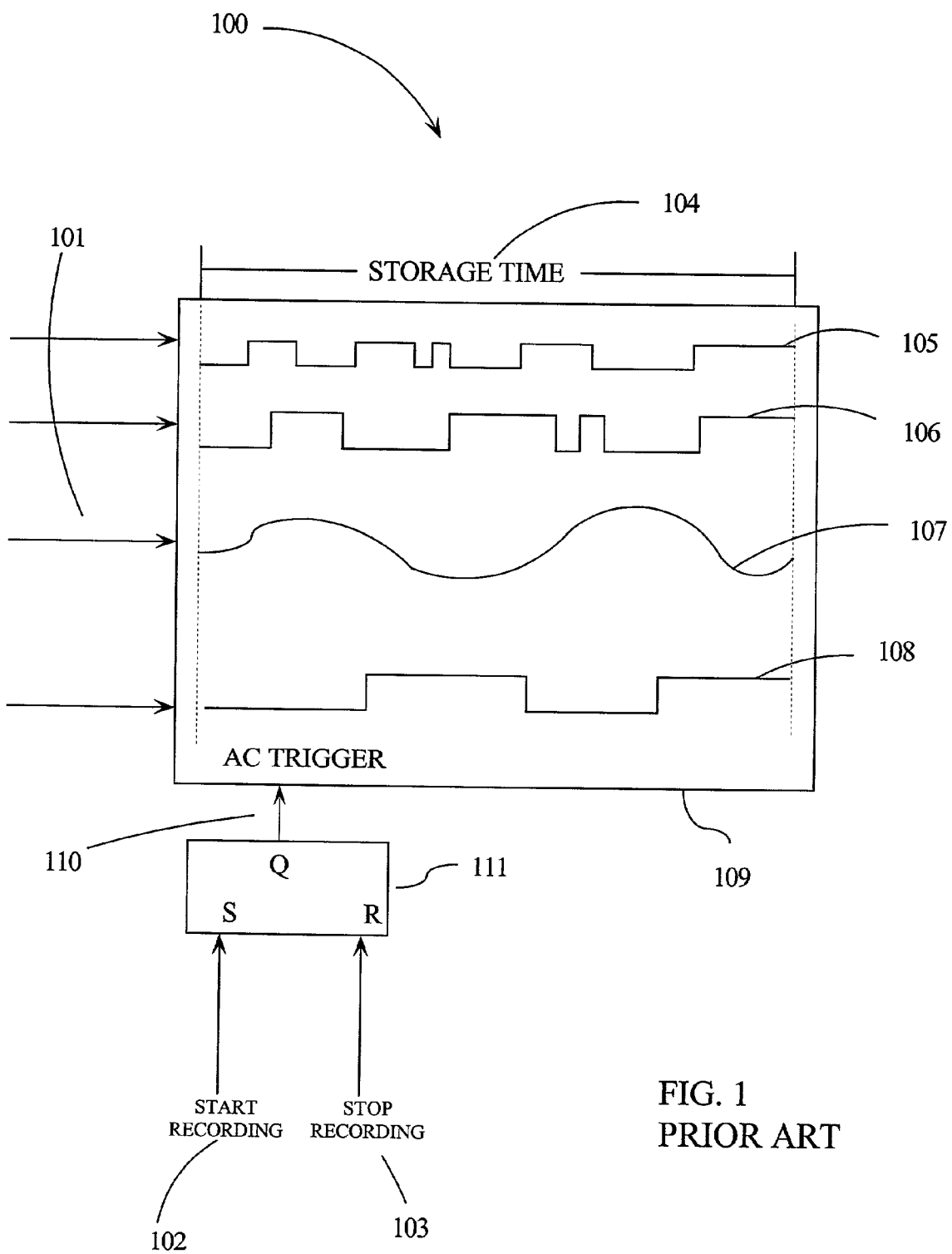
FIG. 1 is a block diagram of a prior art transient event recording system.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 is a simple block diagram of a transient event recoding system 100 that may be found in the prior art. A transient event recorder 109 has four inputs 101 with a storage time 104. For example, transient event recorder 109 may be a storage oscilloscope with storage traces and a sweep time equal to storage time 104. Assuming latch 111 starts in a reset state, a start recording signal 102 is used to set the latch 111 generating a trigger output 110 which triggers storage oscilloscope 109. Inputs 101 will continue to record on the cathode ray tube (CRT) of storage oscilloscope 109 for the duration of the sweep time or storage time 104. If trigger 110 is an alternating current (AC) trigger requiring a transition, then the information will remain stored on the CRT until a stop recording signal 103 resets latch 111 and allows a new start recording signal 102 to again cause a transition and a new storage cycle. In this example, transient event recorder 109 is recording digital signals 105, 106 and 108 and an analog signal 107.

Figure 2:
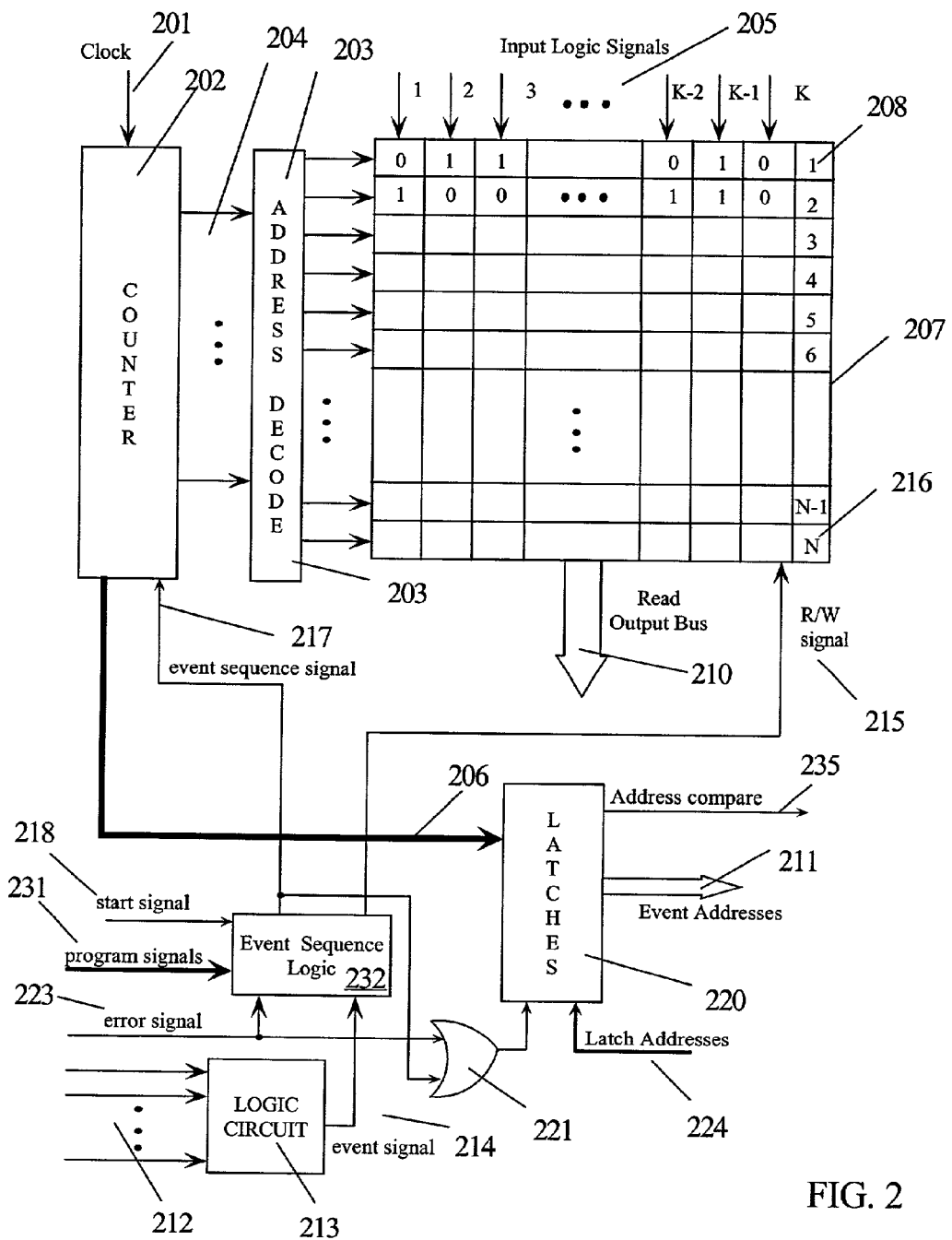
FIG. 2 is a block diagram according to embodiments of the present invention.

FIG. 2 is a block diagram of a system 200 for storing traces according to embodiments of the present invention. It is desired to capture the states of input logic signals 205 in trace array 207 corresponding to sequences of event signals 214 that precede an actual error signal 223. A trace is a sequence of states of an input logic signal. Event signal 214 may be generated in logic circuit 213 as a logic combination of signals 212 that are related to operation states in a VLSI chip. Event signal 214 is a repeating and predetermined state that precedes a related operation that, on occasion, causes an error condition signaled by error signal 223. For example, a write to a particular location in a cache memory (not shown) may be an event that, after a number of writes to the particular location, results in an error signal 223. Since trace array 207 is limited in size, recording traces corresponding to all events 214 prior to an error 223 may not be possible. Also, knowing beforehand which particular event 214 to use to start recording traces in trace array 207 may not be possible. The embodiment of the present invention in FIG. 2 is a way to guarantee, for example, a 50% chance of capturing traces prior to a particular event signal 214. The general problem is capturing traces corresponding to a particular event signal 214 the occurs prior to an error signal 223.

Counter 202 counts clock signal 201 to create addresses 204 for trace array 207 via address decoder 203. Counter 202 is configured so that it counts up to a count N then it resets to its initial state and counts to N again, thus cycling through trace array 207. If read/write (R/W) signal 215 sets trace array 207 in the write mode, then states of input logic signals 205 will be recorded sequentially in entry 208 through entry 216. Event sequence signal 217 gates clock signal 201 within counter 202 to start and stop counting clock 201. Since it is not known beforehand how many event signals 214 occur during N entries of trace array 207, gating counter 202 with only an error signal 223 would not guarantee that traces corresponding to a particular preceding event signal 214 would be stored. The only guarantee would be that the N traces preceding the error signal would be saved.

Referring to FIG. 2, a start signal 218 is received in event sequence logic 232 along with event signal 214 and program inputs 231. These signals are used to generate an event sequence signal 217 for starting and stopping counter 202. Counter 202 starts the storing of states of input signals 205 in entries 208 through 216. The output of counter 202 is also coupled to latches 220 via signals 206. When an event sequence signal 217, which stops counting in counter 202, or an error signal 223 occurs, then the output of OR gate 221 cause latches 220 to store the counter value which may be later read as event addresses 211. Event addresses 211 are the addresses of trace array 207 where the particular states of input logic signals 205, corresponding to event signals 214 and error signal 223, are stored. Program inputs 231 to event logic 232 allow different conditions of error signal 223, start signal 218, and event signal 214 to determine when to start and stop counting clock signal 201 in counter 202.

In one embodiment of the present invention, each event signal 214 generates an event sequence signal 217 (sequence is equal to one). The event logic is programmed to start counting on start signal 218 thereby generating sequential addresses 204 cycling trace array 207. Event logic 232 would likewise set R/W signal 215 to write allowing states of input logic signals 205 to be stored in entries of trace array 207. In this embodiment, the first event signal 214 after start 218 would set event sequence signal 217 to stop counter 202 and thus the recording of traces. If an error signal 223 occurred after the first event signal 214, then the counter remains stopped, and the traces prior to the first event signal 214 would be saved in trace array 207. However, if no error signal 223 occurs after the first event signal 214 and a second event sequence signal 217 is generated on the second event signal 214, counter 202 again starts counting and thus continues the recording of traces in trace array 207. If an error signal 223 occurs after the second event signal 214, then at least one of the last events (indicated by event signals 214) prior to the error signal 223 will have traces stored. If recording was not stopped on the second event signal 214, then subsequent traces may overwrite the traces corresponding to an event signal 214 and only the traces prior to the actual error signal 223 would be guaranteed to be stored in trace array 207. Once an error signal 223 occurs and counter 202 is stopped, a R/W signal 215 may be generated in event logic 232 in response to program inputs 231 to set trace array 207 in the read mode. A start 218 would start counter 202 thus generating sequential addresses for trace array 207 and allow the read out of trace array 207 via read output bus 210. Likewise, inputting latch addresses 224 would allow event addresses 211 to be read out of latches 220. Comparing the event addresses 211 to counter addresses 206, during a read out, would enable the actual stored states of logic signals 205, recorded during event signals 214 and error signal 223, to be identified using an address compare signal 235. In this embodiment, traces preceding odd numbered event signals 214 (e.g., first, third, etc. event signals 214) following a start signal 218 are saved.

In another embodiment of the present invention, where the event sequence is one, program inputs 223 set event logic 232 to generate an event sequence signal 217 to start counting in counter 202 after the second event signal 214 following a start signal 218. In this embodiment, traces preceding even numbered event signals 214 following a start signal 218 are saved. Other embodiments of the present invention use the program inputs 232 and event logic 232 to create other sequences of event signals 214 to start and stop counting in counter 202 using event sequence signal 217. For example, it may be known that a certain number "L" of event signals 214 occur before an error signal 223. With this information, program inputs 231 may set event logic 232 to select a sequence of event signals 214 to start and stop counting which generate a statistical guarantee of capturing particular traces corresponding to a particular event signal 214 occurring prior to an error signal 223. In this manner, trace array 207 may be operable to capture the traces corresponding to the "Last" minus Kth event signal 214 preceding an error signal 223 where K is an arbitrary integer. The statistical chance of capturing the traces corresponding to the "Last" minus Kth event signal 214 may be calculated for a particular trace array 207 with entry capacity N when event signals 214 have an occurrence rate "J" before an error signal 223.

Figure 3:
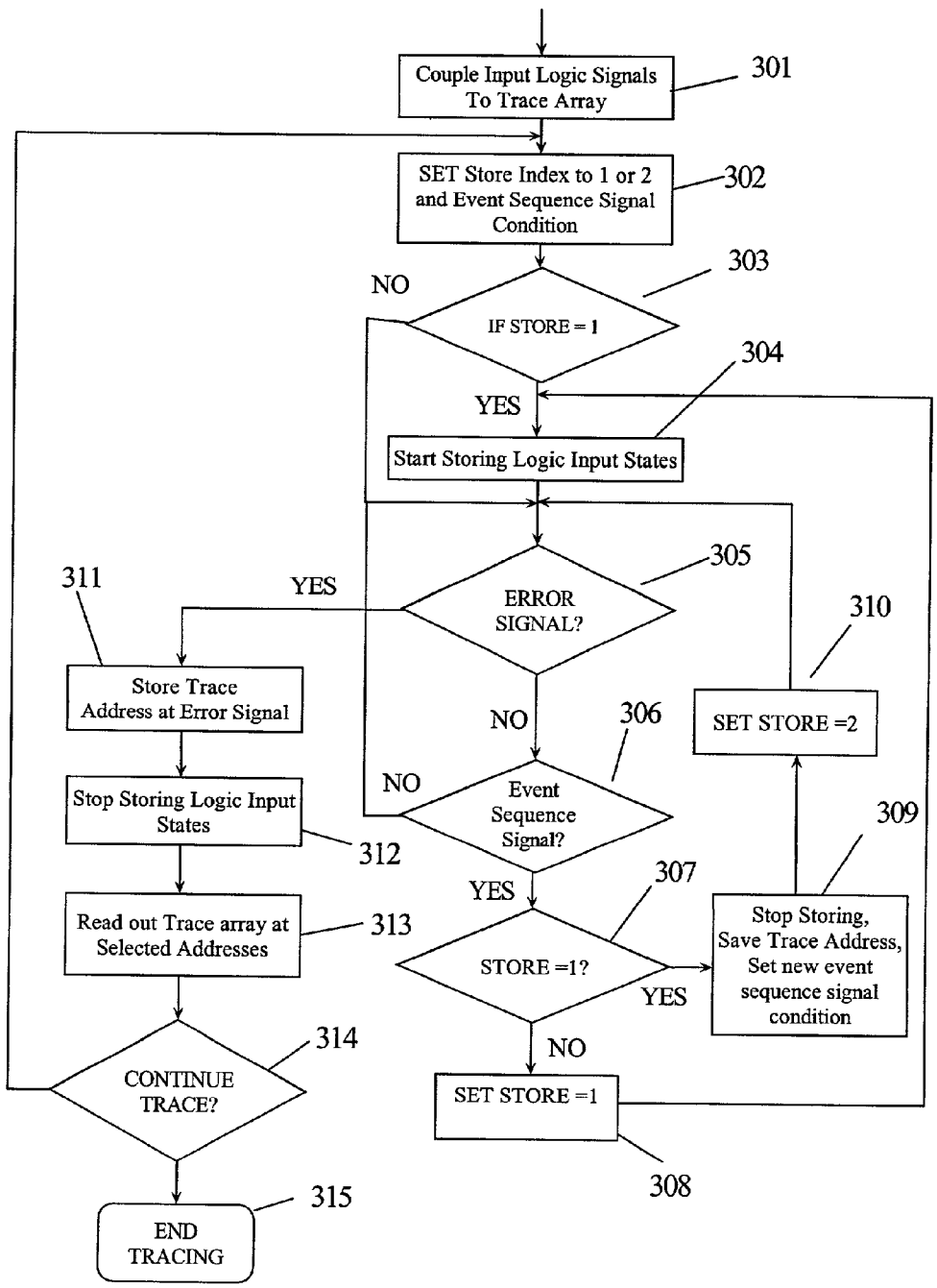
FIG. 3 is a flow diagram of method steps in embodiments of the present invention.

FIG. 3 is a flow diagram of method steps in embodiments of the present invention. In step 301, the input logic signals 205 are coupled to trace array 207. In step 302, a store index is set to one to start storing states of input logic signals 205 in trace array 207 or two to wait for an event sequence signal 217 before starting to store states of input logic signals 205. The store index is an arbitrary number to allow the flow chart to distinguish between a start and a stop for trace storing. In step 303, a test is done to determine if the store index is equal to one. If the result of the test in step 303 is YES, then the storing of states of input logic signals 205 in started in step 304. If the result of the test in step 303 is NO, then a test is done in step 305 to determine if an error signal 223 has occurred. If the result of the test in test 303 is NO, then the test in step 305 is repeated. If the result of the test in step 305 is NO, then a test is done in step 306 to determine if an event sequence signal 217 has occurred. If the result of the test in step 306 is NO, then a branch to step 305 is executed waiting an error signal 223 or the expected event sequence signal 217. If the result of the test in step 306 is YES, then a test is done in step 307 to determine if the store index is equal to one. If the result of the test in step 307 is YES, then storing is halted in step 309, the trace address for the particular event signal 214 is saved, and a new event sequence condition (how many events determines the event sequence) is set. In step 310, the store index is set to two and a branch is executed to step 305 awaiting an error signal 223 or the new event sequence signal 217. If the result of the test in step 307 is NO, then the store index is set to one in step 308 and a branch is executed to step 304 when storing is again started. If the result of the test in step 305 is YES, then the trace array address at the error signal 223 is stored in step 311. In step 312, storing of states of input logic signals 205 is stopped. In step 313, the stored traces at selected trace array 207 addresses are read out on read bus 210. In step 314, a test is done to determine whether to continue tracing. If the result of the test in step 314 is NO, the tracing is ended in step 315. If the result of the test in step 314 is YES, then a branch to step 302 is executed to set a new store index of one or two.

Figure 5:
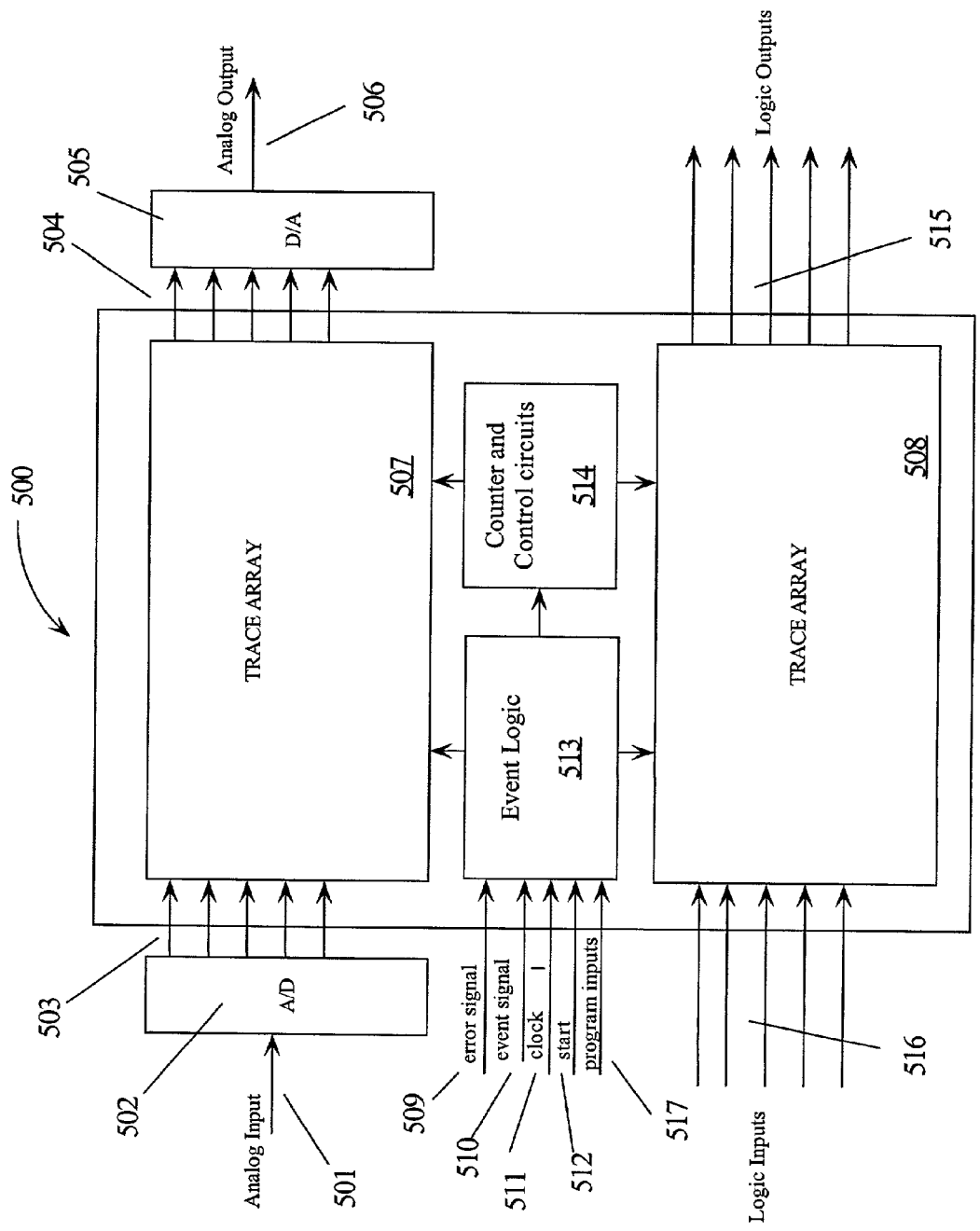
FIG. 5 is another embodiment of the present invention where both analog and digital signals are traced.

FIG. 5 is another embodiment of the present invention where two trace arrays 507 and 508, for an analog and digital debugging system 500, are configured like trace arrays 200 in FIG. 2. In this embodiment, a trace array 507 is used for an analog signal 501 and trace array 508 is used for logic signals 516. Analog to digital converter 502 converts the analog signal to logic signals 504. Trace arrays 507 and 508 are operated as described in FIG. 2 and logic signals 504 corresponding to analog signal 501 and logic inputs 516 are stored until an error signal 509 occurs. The logic outputs 515 and the analog output 506 are read out for analysis. A start signal 512 is used in event logic 513 to generate signals to start both trace array 507 and 508. Event signal 510 is used to switch the sub-arrays in trace arrays 507 and 508 and clock signal 511 is counted to generate addresses for trace arrays 507 and 508 as was done for trace array 307 in FIG. 2. Multiple analog channels may be employed by duplicating A/D converter 502, trace unit 507 and D/A converter 505. If trace array 507 has sufficient number of inputs 503, then analog and digital signals may be recorded in one trace array 507.

The embodiment of the present invention in FIG. 5 is useful in debugging an exemplary electro-mechanical system where a mechanical device (not shown), undergoing multiple moves, is being observed. The mechanical device may start and complete a mechanical move in response to corresponding start and stop motion signals. The performance of the mechanical device depends on initial conditions when a move is made. For example, a mechanical device may have a varying initial position and velocity which may affect the dynamics of a particular move. The mechanical device may fail after a number of successive moves (e.g., does not arrive at a prescribed position at a prescribed time, with a prescribed velocity) and it is desirable to have stored the states of analog and digital signals, corresponding to the motion of a mechanical device and its control circuits, preceding an actual failure. Embodiments of the present invention, described in FIG. 2 and FIG. 5, enable a number of events preceding an event in which a failure occurred to be stored and analyzed to debug an electro-mechanical system. Embodiments of the present invention work well in capturing states of input signals 501 and 516 that immediately precede the error signal 509.

Figure 4:
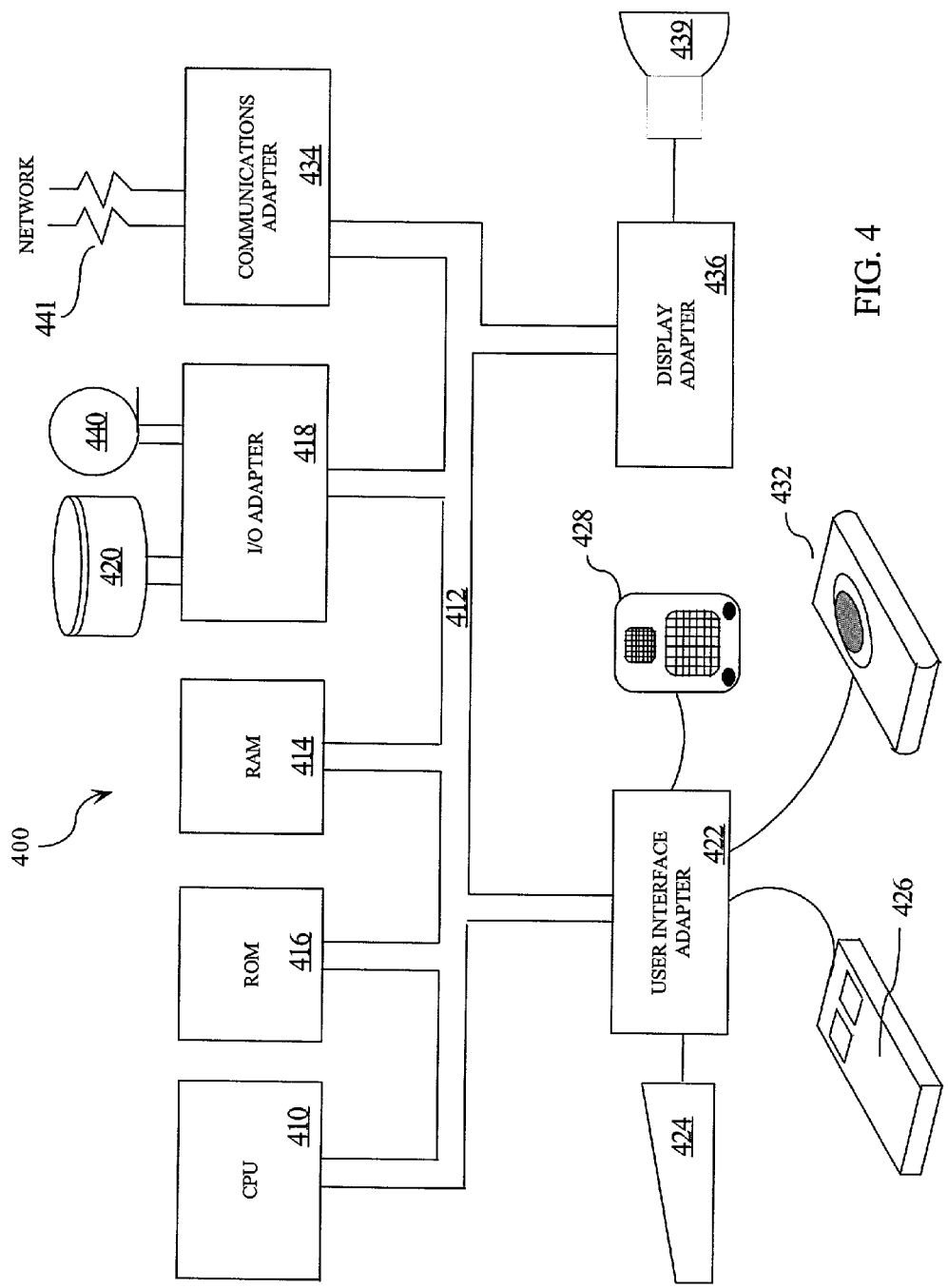
FIG. 4 is a block diagram of a data processing operable to use a VLSI chip employing a trace array according to embodiments of the present invention.

FIG. 4 is a high level functional block diagram of a representative data processing system 400 suitable for practicing the principles of the present invention. Data processing system 400, includes a central processing system (CPU) 410 operating in conjunction with a system bus 412. CPU 410 may employ a VLSI processor chip which uses debug methods and circuits according to embodiments of the present invention. System bus 412 operates in accordance with a standard bus protocol, such that as the ISA protocol, compatible with CPU 410. CPU 410 operates in conjunction with read-only memory (ROM) 416 and random access memory (RAM) 414. Among other things, ROM 416 supports the Basic Input Output System (BIOS). RAM 414 includes, DRAM (Dynamic Random Access Memory) system memory and SRAM (Static Random Access Memory) external cache. I/O Adapter 418 allows for an interconnection between the devices on system bus 412 and external peripherals, such as mass storage devices (e.g., a hard drive, floppy drive or CD/ROM drive), or a printer 440. A peripheral device 420 is, for example, coupled to a peripheral control interface (PCI) bus, and I/O adapter 418 therefore may be a PCI bus bridge. User interface adapter 422 couples various user input devices, such as a keyboard 424, mouse 426, touch pad 432 or speaker 428 to the processing devices on bus 412. Display adapter 436 supports a touch screen display 438 for acquiring touch data according to embodiments of the present invention. Display 439 which may be, for example, a cathode ray tube (CRT), liquid crystal display (LCD) or similar conventional display units. Display adapter 436 may include among other things a conventional display controller and frame buffer memory. Data processing system 400 may be selectively coupled to a computer or telecommunications network 441 through communications adapter 434. Communications adapter 434 may include, for example, a modem for connection to a telecom network and/or hardware and software for connecting to a computer network such as a local area network (LAN) or a wide area network (WAN). CPU 410 may comprise a VLSI chip that has a trace array and associated circuits according to embodiments of the present invention. Logic signals of circuits being tested are directed to a buss coupled to the input of trace array 207 and states of the input logic signals 205 may be stored and analyzed according to embodiments of the present invention.

Although the present invention and its advantages have been described in detail, it should be understood that various changes, substitutions and alterations can be made herein without departing from the spirit and scope of the invention as defined by the appended claims.

What is claimed is:

1. A method for debugging a system comprising:
   1) coupling first signals to a re-writeable trace array, said trace array having M storage locations, said M storage locations having corresponding M storage addresses from a starting address to an ending address;
   2) generating a first event sequence signal in response to a first sequence of occurrences of a first event signal;
   3) starting, in response to said first event sequence signal, a process of storing states of said first signals sequentially in said trace array at locations beginning at said starting address and proceeding sequentially to said ending address, said process of storing states of said first signals wrapping back to said starting address when said ending address is exceeded;
   4) generating a second event sequence signal in response to a second sequence of occurrences of said first event signal;
   5) stopping said process of storing states of said first signals in said trace array in response to said second event sequence signal; and
   6) repeating steps 2) through 5) unless stopped by a second event signal.

2. The method of claim 1, further comprising the step of: storing an event storage address in response to receipt of said first event sequence signal, said second event sequence signal or said second event signal, said event storage address corresponding to a storage address of sub-array K which is storing states of said first signals when said first event sequence signal, said second event sequence signal or said second event signal occurred.

3. The method of claim 2, further comprising the steps of: reading stored states of said first signals from selected storage addresses of said trace array; and
   analyzing said stored states of said first signals to debug or analyze said system.

4. The method of claim 3, wherein one of said stored event storage addresses is compared to a read storage address of said trace array during reading said stored states of said first signals, a comparison match of said stored event storage address to said read storage address corresponding to event or error states of said first signals.

5. The method of claim 1, wherein said system comprises logic circuits in a very large scale integrated circuit (VLSI) chip.

6. The method of claim 5, wherein said re-writeable trace array is included within said VLSI chip.

7. The method of claim 1, wherein said first and second event signals are logic combinations of circuit states occurring within said system.

8. The method of claim 1, wherein a storage address of said trace array, corresponding to said first event sequence signal, said second event sequence signal or said second event signal, is saved.

9. The method of claim 1, wherein said first sequence of occurrences of said first event signal comprises a next sequential first event signal following a start signal.

10. The method of claim 1, wherein said second sequence of occurrences of said first event signal comprises a next sequential first event signal following said first event sequence signal.

11. The method of claim 9, wherein said second sequence of occurrences of said first event signal comprises a next sequential first event signal following said first event sequence signal.

12. An apparatus for debugging a system comprising:
a coupling circuit operable to couple first signals to a re-writeable trace array, said trace array having N storage locations, said N storage locations having corresponding N storage addresses from a starting address to an ending address;
an event sequence circuit operable to generate a first event sequence signal in response to a first sequence of occurrence of a first event signal and a second event sequence signal in response to a second sequence of occurrence of said first event signal;
a store circuit operable to stores states of said first signals in said trace array by cyclically repeating the selection of said N storage addresses from a start storage address through an Nth storage address, said store circuit starting said store of said first signals in response to said first event sequence signal and stopping said store of said first signals in response to said second event sequence signal or a second event signal; and
a read circuit operable to read contents of said trace array at selected ones of said N storage addresses.

13. The apparatus of claim 12, further comprising an address store circuit operable to store an event storage address in response to receipt of said first event sequence signal, said second event sequence signal or said second event signal, said event storage address corresponding to a storage address of said trace array which is storing states of said first signals when said first event sequence signal, said second event sequence signal or said second event signal occurred.

14. The apparatus of claim 13, further comprising a compare circuit operable to compare one of said event storage addresses to a read storage address of said trace array during reading said stored states of said first signals, a comparison match of said event storage address to said read storage address corresponding to event or error states of said first signals.

15. The apparatus of claim 12, wherein said system comprises logic circuits in a very large scale integrated circuit (VLSI) chip.

16. The apparatus of claim 15, wherein said re-writeable trace array is included within said VLSI chip.

17. The apparatus of claim 12, wherein said first and second event signals are logic combinations of circuit states occurring within said system.

18. The apparatus of claim 12, wherein contents of said trace array at selected addresses are read out and analyzed to debug or analyze said system.

19. The apparatus of claim 12, wherein an address of said trace array, corresponding to said first event sequence signal, said second event sequence signal or said second event signal, is saved.

20. The apparatus of claim 12, wherein said first sequence of occurrences of said first event signal comprises a next sequential first event signal following a start signal.

21. The apparatus of claim 12, wherein said second sequence of occurrences of said first event signal comprises a next sequential first event signal following said first event sequence signal.

22. The apparatus of claim 20, wherein said second sequence of occurrences of said first event signal comprises a next sequential first event signal following said first event sequence signal.

23. A data processing system comprising:
a central processing unit (CPU);
random access memory (RAM);
read only memory (ROM);
an I/O adapter; and
a bus system coupling said CPU to said ROM, said RAM, wherein said CPU further comprises:
a very large scale integrated (VLSI) chip, said VLSI chip comprising a debugging system for debugging circuits within said chip said debugging system comprising;
a coupling circuit operable to couple first signals to a re-writeable trace array, said trace array having N storage locations, said N storage locations having corresponding N storage addresses from a starting address to an ending address;
an event sequence circuit operable to generate a first event sequence signal in response to a first sequence of occurrence of a first event signal and a second event sequence signal in response to a second sequence of occurrence of said first event signal;
a store circuit operable to stores states of said first signals in said trace array by cyclically repeating the selection of said N storage addresses from a start storage address through an Nth storage address, said store circuit starting said store of said first signals in response to said first event sequence signal and stopping said store of said first signals in response to said second event sequence signal or a second event signal; and
a read circuit operable to read contents of said trace array at selected ones of said N storage addresses.

24. The data processing of claim 23, further comprising an address store circuit operable to store an event storage address in response to receipt of said first event sequence signal, said second event sequence signal or said second event signal, said event storage address corresponding to a storage address of said trace array which is storing states of said first signals when said first event sequence signal, said second event sequence signal or said second event signal occurred.

25. The data processing of claim 24, further comprising a compare circuit operable to compare one of said event storage addresses to a read storage address of said trace array during reading said stored states of said first signals, a comparison match of said event storage address to said read storage address corresponding to event or error states of said first signals.

26. The data processing of claim 23, wherein said system comprises logic circuits in a very large scale integrated circuit (VLSI) chip.

27. The data processing of claim 26, wherein said re-writeable trace array is included within said VLSI chip.

28. The data processing of claim 23, wherein said first and second event signals are logic combinations of circuit states occurring within said system.

29. The data processing of claim 23, wherein contents of said trace array at selected addresses are read out and analyzed to debug or analyze said system.

30. The data processing of claim 23, wherein an address of said trace array, corresponding to said first event sequence signal, said second event sequence signal or said second event signal, is saved.

31. The data processing of claim 23, wherein said first sequence of occurrences of said first event signal comprises a next sequential first event signal following a start signal.

32. The data processing of claim 23, wherein said second sequence of occurrences of said first event signal comprises a next sequential first event signal following said first event sequence signal.

33. The data processing of claim 32, wherein said second sequence of occurrences of said first event signal comprises a next sequential first event signal following said first event sequence signal.

34. A method for debugging a system comprising:
1) coupling first signals to a re-writeable trace array having M storage locations with corresponding M storage addresses from a starting address to an ending address;
2) generating a start/stop signal on an occurrence of an event sequence;
3) starting a process of recording states of said first signals in the trace array in a present storage address in said M storage addresses in response to said start/stop signal by enabling a write to said trace array and incrementing said present storage address proceeding sequentially to said ending address, wherein said present storage address wraps back to said starting address when said ending address is exceeded;
4) stopping the process of recording states of said first signals in said trace array at said present storage address in response to said start/stop signal generated by a next occurrence of said event sequence following said occurrence of said event sequence starting said process of recording states of said first signals; and
5) repeating steps 2) through 4) until stopped by an error signal different from said start/stop signal.

35. The method of claim 34, further comprising the step of:
storing said present storage address in response to said start/stop signal or said error signal.

36. The method of claim 35, further comprising the steps of:
enabling a read of said trace array and reading recorded states of said first signals from selected storage addresses of said trace array following an occurrence of said error signal; and
analyzing said recorded states of said first signals to debug or analyze said system.

\* \* \* \* \*